US00RE38592E1

(19) United States
(12) Reissued Patent
Wu et al.

(10) Patent Number: US RE38,592 E
(45) Date of Reissued Patent: Sep. 21, 2004

(54) MULTIPLE EFFECT PYROTECHNIC SHELL

(75) Inventors: Francis Wu, Central Hong Kong (HK); Michael Marietta, Pittsburg, KS (US)

(73) Assignee: Jake's Fireworks, Inc., Pittsburg, KS (US)

(21) Appl. No.: 10/280,857

(22) Filed: Oct. 25, 2002

Related U.S. Patent Documents

Reissue of:
(64) Patent No.: 6,283,033
Issued: Sep. 4, 2001
Appl. No.: 09/364,594
Filed: Jul. 30, 1999

(51) Int. Cl.[7] ..... F42B 4/06
(52) U.S. Cl. ..... 102/352; 102/336; 102/360; 102/361; 102/345
(58) Field of Search ..... 102/362, 352, 102/336, 360, 361, 345

(56) References Cited

U.S. PATENT DOCUMENTS

| | | | | | |
|---|---|---|---|---|---|
| 480,012 | A | * | 8/1892 | Hand et al. | 102/336 |
| D25,275 | S | * | 3/1896 | Ives | 102/33 X |
| 1,770,921 | A | * | 7/1930 | Hitt | 102/33 |
| 1,773,197 | A | * | 8/1930 | Mulcahy | 102/33 |
| 1,861,893 | A | * | 6/1932 | Yamagishi | 102/361 |
| 1,972,478 | A | * | 9/1934 | Fabrizio | 102/361 |
| 2,103,936 | A | * | 12/1937 | Decker | 102/20 |
| D164,423 | S | * | 9/1951 | Howell | 102/33 X |
| 3,145,530 | A | * | 8/1964 | Sobey | 60/35.6 |
| 3,227,084 | A | * | 1/1966 | Stokes et al. | 102/33 |
| 3,404,782 | A | * | 10/1968 | Ray | 211/49 |
| 4,697,518 | A | * | 10/1987 | Lau et al. | 102/361 X |
| 4,771,695 | A | * | 9/1988 | Simpson | 102/343 |
| 5,339,741 | A | * | 8/1994 | Craven et al. | 102/361 |
| 5,429,053 | A | * | 7/1995 | Walker | 102/342 |
| 5,526,750 | A | * | 6/1996 | Poor et al. | 102/361 |
| 5,623,113 | A | * | 4/1997 | Valembois | 89/1.817 |
| 5,627,338 | A | * | 5/1997 | Poor et al. | 102/342 |
| 5,739,462 | A | * | 4/1998 | Poor et al. | 102/361 |
| 5,983,801 | A | * | 11/1999 | Brunn | 102/336 X |
| D429,516 | S | | 8/2000 | Wu et al. | D22/112 |

FOREIGN PATENT DOCUMENTS

| | | | | |
|---|---|---|---|---|
| DE | 71493 | * | 1/1969 | 102/361 |

OTHER PUBLICATIONS

Author Unknown, Washington Post Newspaper, Metro Section, p. B7 (2 pages herein), Jul. 4, 2000.*
Advertising piece which shows a double effect shell in the Pro–Mag and 3rd Generation displays (adverisement published in the American Pyrotechnics Association booklet on Sep. 22, 1998).*

* cited by examiner

*Primary Examiner*—Michael J. Carone
*Assistant Examiner*—Denise J. Buckley
(74) *Attorney, Agent, or Firm*—Hovey Williams LLP

(57) ABSTRACT

A multiple effect pyrotechnic shell (20), having a lift chamber (22), primary break (24), secondary break (26), and a tertiary break (28) has a desired weight distribution to inhibit tumbling. The secondary break weight is less than the primary break weight, and the tertiary break weight is less than both the primary and secondary break weights. Thus, the center of gravity of the shell (20) is positioned below a midpoint of the shell height. A first timing fuse (46) extends from a lift charge (30) into a primary break charge (50A) of the primary break (24), and a primary internal timing fuse (64) extends from the primary break (24) to the secondary break (26). Further, a secondary internal timing fuse (70) extends from the secondary break (26) to the tertiary break (28). Fuse fragments (52) are preferably disbursed within the break hulls (48) to provide filler and add an additional effect to each break (24–28).

20 Claims, 1 Drawing Sheet

MULTIPLE EFFECT PYROTECHNIC SHELL

Matter enclosed in heavy brackets [ ] appears in the original patent but forms no part of this reissue specification; matter printed in italics indicates the additions made by reissue.

FIELD OF THE INVENTION

This invention relates to pyrotechnic devices and, more particularly, to class C fireworks in the form of artillery shells having multiple breaks.

BACKGROUND OF THE INVENTION

The pyrotechnic industry is continuously developing new pyrotechnic effects for class C fireworks. Class C fireworks are those intended for use by ordinary consumers. These efforts have resulted in artillery shell type fireworks with many colors and dispersal patterns. However, the industry has encountered limitations in combining more than one effect or break into a single artillery shell. For example, class C fireworks are restricted to a total of 40 grams of break charge, and the secondary breaks of the shell should not be projected by explosion of the primary breaks so that the secondary breaks explode on or near the ground. One multiple effect shell includes two breaks of equal size. However, the two break shell fails to include features which control the direction which the secondary breaks are projected by the primary breaks. Further, the two break shell fails to include features which would permit tertiary and higher level breaks.

BRIEF SUMMARY OF THE INVENTION

There is, therefore, provided in the practice of the invention a novel pyrotechnic shell, which includes at least three effects without increasing the occurrences of ground explosions. The pyrotechnic shell broadly includes a primary break, secondary break, and tertiary break. Each of the breaks has its own weight, and the respective break weights are selected to inhibit tumbling.

In a preferred embodiment, the secondary break weight is less than the primary break weight, and the tertiary break weight is less than the secondary break weight. Preferably, the center of gravity of the shell is spaced from and located below a vertical midpoint of the shell. The preferred embodiment also includes two internal timing fuses. A primary timing fuse extends from the primary break to the secondary break, and a secondary timing fuse extends from the secondary break to the tertiary break. The two timing fuses are preferably spaced apart within the secondary break. The shell also includes a lift chamber containing a lift charge. The lift chamber is attached to the bottom of the primary break to further inhibit tumbling.

In an alternate embodiment, the shell includes at least one break, and fuse fragments are distributed within the hull of the break. The fuse fragments act as filler and add an additional effect. Preferably, the fuse fragments are substantially evenly distributed within the hull, and secondary and tertiary breaks are also provided having fuse fragments within their respective hulls.

Accordingly, it is an object of the present invention to provide an improved multiple effect pyrotechnic shell which inhibits the occurrence of ground explosions.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein.

DETAILED DESCRIPTION

Figure 1:
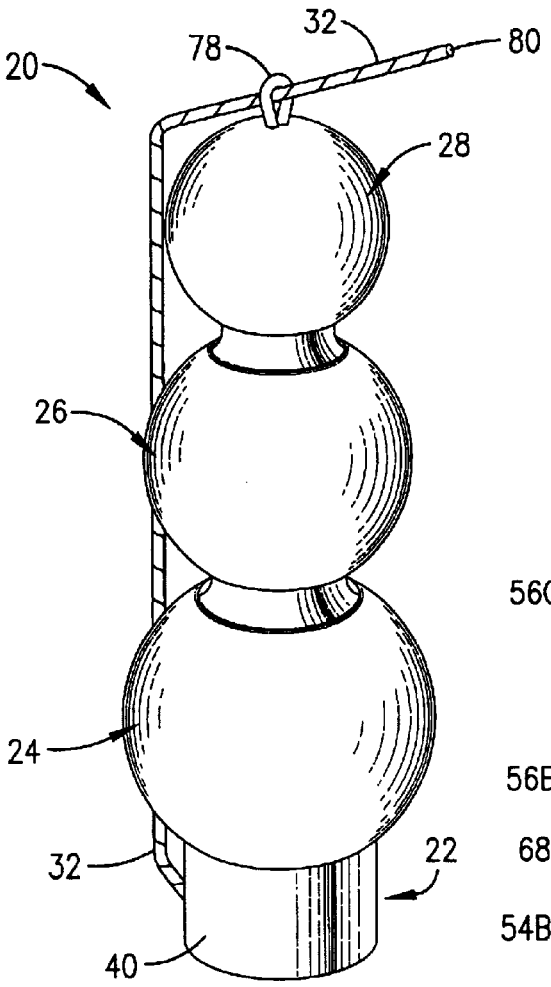
FIG. 1 is a prospective view of a multiple effect pyrotechnic shell according to the present invention.
Figure 2:
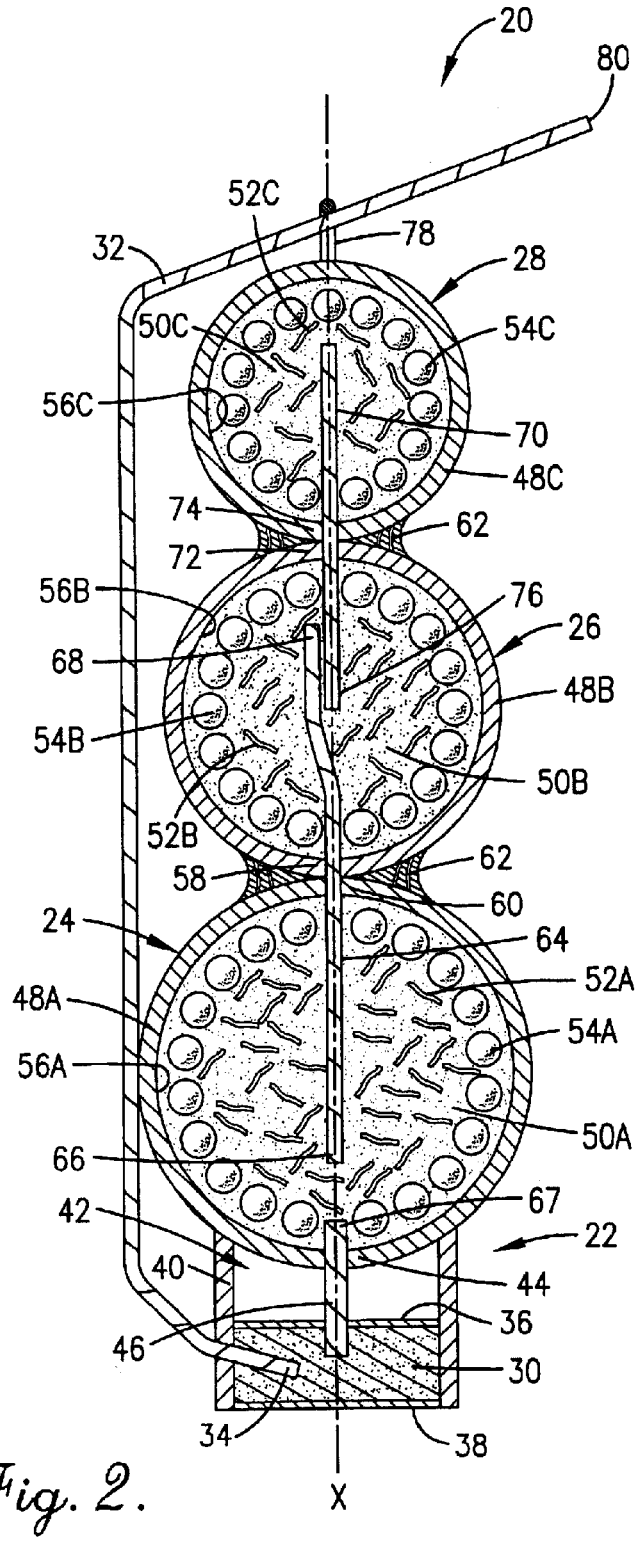
FIG. 2 is a vertical cross sectional view of the shell of FIG. 1 which is schematic in that the components are not to scale.

Referring to the drawings in greater detail, FIGS. 1 and 2 show a multiple effect pyrotechnic shell 20 constructed in accordance with a preferred embodiment of the present invention. The shell 20 broadly includes a lift chamber 22, primary break 24, secondary break 26, and tertiary break 28. The lift chamber 22 and breaks 24–28 are weighted to inhibit tumbling, thereby reducing the occurrences of ground explosions while providing the capability to display at least three effects.

The lift chamber 22 contains a lift charge 30 sized to project the shell to a sufficiently high altitude for explosion of the breaks 24–28. An elongated and external safety fuse 32 has a terminal end 34 embedded in the lift charge 30. The lift charge 30 and terminal end 34 of the external fuse 32 are held between upper and lower closures 36, 38 and an outer cylindrical wall 40 which attaches to the primary break 24. An open area 42 is preferably left between the upper closure 36 and the bottom 44 of the primary break 24. The external fuse 32 is sufficiently long to allow an operator to move a safe distance away from the shell and the tube (not shown) from which the shell is being launched. A first timing fuse 46 extends from the lift charge 30 through the upper closure 36 and into the primary break 24. The first timing fuse 46 is preferably coated so that the primary break is not ignited until the first timing fuse is substantially entirely exhausted.

The primary, secondary, and tertiary breaks 24–28 have many similar features which will be identified with similar reference numerals distinguished in the description and the drawing by the suffixes A, B, and C for the primary, secondary and tertiary breaks, respectively. These similar features are distinguished in the claims by appropriate use of the terms primary, secondary, and tertiary. Further, the similar features of the breaks will be described to the extent necessary for an understanding of the invention.

The primary break 24 includes a substantially spherical primary hull 48A, a primary break charge 50A, and a plurality of primary fuse fragments 52A substantially evenly distributed within the primary hull 48A. A plurality of primary effects 54A are held within the hull and are positioned adjacent to the inner surface 56A of the hull 48A in a desired arrangement to achieve a desired disbursal pattern. Additional filler material (not shown) can also be included within the hull.

The secondary break 26 has a bottom 58 which is attached to a top 60 of the primary break 24. The respective hulls are preferably formed of papier-maché, and threads 62 preferably join the primary break to the secondary break. Additional material is added at the joint between the breaks to strengthen the connection. A primary internal timing fuse 64 extends from within the primary break into the secondary break. The primary timing fuse 64 is preferably coated with a primer paste at its ends 66, 68 so that it is ignited at its lower end 66. Further, the primary fuse has a black powder core held inside two layers of fiber string, so that the fuse does not ignite the secondary break charge until the flame reaches the primer paste at the upper end 68 of the primary timing fuse 64. The primary timing fuse preferably has an outer diameter of approximately 3.5 mm with a core of approximately 0.75 mm. Typical fuses with an outer diameter of 2.5 mm include a core of only 0.5 mm. The increased diameter of the black powder core produces a larger first flash. The first flash occurs when the primer paste at the top end of the fuse ignites. The first flash is larger because the larger diameter black powder core ignites more of the paste simultaneously and the core itself is bigger. In turn, the larger first flash provides a more consistent ignition of the breaking charge, the effects, and the next timing fuse. The larger core also provides a more consistent burn rate, so that the explosions of the breaks are more precisely timed. The lower end 66 of the primary timing fuse 64 is preferably spread apart from a top end 67 of the first timing fuse 46. Preferably, each fuse has its ends coated with primer paste.

The secondary break weight is less than the primary break weight. Preferably, the primary breaking charge is approximately 18 grams and the secondary breaking charge is approximately 12 grams. The secondary hull 48B, which is also substantially spherical, is preferably smaller in diameter than the primary hull 48A. The tertiary hull 48C is also substantially spherical and has a diameter smaller than both the primary and secondary hulls. Further, the tertiary breaking charge is approximately 9 grams. Thus, the tertiary break weight is less than both the primary and secondary break weights. Because the tertiary break weight is less than the secondary break weight and the secondary break weight is less than the primary break weight, the primary, secondary and tertiary break weights are selected to inhibit tumbling and to position the center of gravity of the shell below and spaced apart from the vertical midpoint of the height of the shell. The lift chamber also contributes to this position, but its contribution, due to weight, is minimal because most of its mass is lost when the lift charge explodes.

The three breaks 24–28 are preferably have central axes aligned along a central, vertical axis X, so that they form an ornamental "snowman" configuration. Functionally, the size of the hulls could be adjusted, so that they are substantially the same if the weight distribution is maintained to inhibit tumbling. Additional filler can be added at minimal cost to maintain the desired configuration of the respective effects 50 without increasing the break charges or substantially changing the relative break weights. To further inhibit tumbling, the shell can be configured for rotation around the central axis X.

A secondary internal timing fuse 70 extends from the top 72 of the secondary break 26 into the bottom 74 of the tertiary break 28. The bottom 74 of the tertiary break 28 is attached to the top 72 of the secondary break 26 with threads 62 in similar fashion to the connection between the primary and secondary breaks. The tertiary break 28 also has a safety fuse support loop 78 at its top to hold the external fuse 32 in position.

The secondary timing fuse 70 is preferably spaced apart from the primary timing fuse, so that the secondary timing fuse 70 is not ignited by the primary timing fuse 64. Further, the top end 68 of the primary fuse 64 is not directed at any point of the secondary fuse. Preferably, the lower end 76 of the secondary timing fuse extends below the upper end 68 of the primary timing fuse 64. Thus, the secondary timing fuse 70 is ignited by the secondary breaking charge 50B. The lengths of the elongated primary and secondary timing fuses are selected to achieve the desired time delay between explosion of the breaks 24–28.

In operation, the shell is placed in a tube (not shown) and an operator ignites the external safety fuse 32 at its exposed end 80. The lift charge 30 is ignited, projecting the shell 20 out of the tube and igniting the first timing fuse 46. The first timing fuse ignites the primary break charge 50A, thereby igniting and scattering the primary effects 54A and igniting the primary timing fuse 64 at its lower end 66. The primary effects have a selected color and disbursal pattern. The primary fuse fragments 52 act as filler in the break and burn to provide an additional effect.

The primary internal timing fuse 64 ignites the secondary break charge 50B which in turn ignites the secondary internal timing fuse 70 at its lower end 76 and ignites and scatters the secondary effects 54B. The secondary effects also have a selected color and disbursal pattern, which are preferably unique from that of the primary effects. The secondary timing fuse 70 ignites the tertiary breaking charge 50C which scatters the tertiary effects 54C, which are also preferably unique from the primary and secondary effects and even more preferably the three unique effects have a synergistic combination such as an overall combined shape or pattern.

The shell 20 according to the present invention provides a weight distribution which inhibits the shell from tumbling. Thus, when the primary break charge explodes, the secondary and tertiary breaks are projected further skyward. Similarly, when the secondary break charge explodes, the tertiary break is also projected further skyward. Therefore, the occurrences of ground explosions are reduced, and it is possible to safely use a Class C multiple effect pyrotechnic shell having more than two effects with minimal risk of ground explosions and any potential injury therefrom.

Thus, a multiple effect pyrotechnic shell is disclosed which utilizes a desired weight distribution to inhibit tumbling thereby permitting use of the multiple effect shell with minimal risk of ground explosions and any injuries which might result therefrom. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A consumer class firework artillery shell comprising:

a primary break including a primary hull containing a primary break charge and a primary effect, the primary break having a primary break weight;

a secondary break including a secondary hull containing a secondary break charge and a secondary effect, the secondary break having a secondary break weight less than the primary break weight, the secondary break being coupled to and positioned above the primary break; and a tertiary break including a tertiary hull containing a tertiary break charge and a tertiary effect, the tertiary break having a tertiary break weight less than the secondary break weight, the tertiary break being coupled to and positioned above the secondary break.

2. The shell according to claim 1 wherein the sum of the primary break [weight] *charge*, the secondary break [weight] *charge*, and the tertiary break [weight] *charge* is less than 40 grams.

3. The shell according to claim 1 further comprising a primary internal timing fuse extending from the primary break to the secondary break and a secondary internal timing fuse from the secondary break to the tertiary break.

4. The shell according to claim 3 wherein the internal timing fuses each comprises an outer diameter of approximately 3.5 mm and a core diameter of approximately 0.75 mm.

5. The shell according to claim 3 wherein the primary fuse is spaced apart from the secondary fuse.

6. The shell according to claim 1 further comprising a lift chamber containing a lift charge, and the lift chamber being attached to a bottom of the primary break.

7. The shell according to claim 6 further comprising a first timing fuse extending from the lift charge to the primary break.

8. The shell according to claim 6 further comprising an external safety fuse extending into the lift charge.

9. The shell according to claim 1 wherein at least one of the primary, secondary, and tertiary breaks includes fuse fragments within the hull.

10. A fireworks shell comprising:

a primary break including a primary hull containing a primary break charge and a primary effect, the primary break having a primary break weight;

a secondary break positioned above and coupled to the primary break and including a secondary hull containing a secondary break charge and a secondary effect, the secondary break having a secondary break weight; and a tertiary break positioned above and coupled to the secondary break and including a tertiary hull containing a tertiary break charge and a tertiary effect, the tertiary break having a tertiary break weight[, and] *;* the primary, secondary, and tertiary break weights [totaling less than 40 grams and] being selected to inhibit tumbling*; and*

*the primary, secondary, and tertiary break charges totaling less than 40 grams.*

11. The shell according to claim 10 wherein the breaks define a central, vertical axis and a height having a midpoint, and the primary, secondary, and tertiary break weights being selected to position the center of gravity below the midpoint along the axis.

12. The shell according to claim 10 wherein the secondary break weight is less than the primary break weight and the tertiary break weight is less than the secondary break weight.

13. The shell according to claim 10 further comprising a lift chamber containing a lift charge and having a lift weight, and the lift chamber being attached to a bottom of the primary break to further inhibit tumbling.

14. The shell according to claim 10 wherein at least one of the primary, secondary, and tertiary breaks includes fuse fragments within the hull.

15. A fireworks shell comprising:

a primary break having a primary break weight;

a secondary break having a secondary break weight, said secondary break being coupled to and positioned above the primary break, said secondary break weight being less than said primary break weight;

a tertiary break having a tertiary break weight, said tertiary break being coupled to and positioned above the secondary break, said tertiary break weight being less than said primary break weight, the sum of said primary, secondary, and tertiary break [weights] *charges* being less than 40 grams; and a lifting charge positioned below and coupled to the primary break for simultaneously propelling the primary, secondary and tertiary breaks into the air.

16. The shell according to claim 15 further comprising a single external fuse connected to the lifting charge and a plurality of internal fuses operatively and respectively interconnecting the lifting charge, the primary break, the secondary break and the tertiary break.

17. The shell according to claim 16 wherein said internal fuses are configured so that while the shell is in the air the primary break ignites before the secondary and tertiary breaks ignite, thereby propelling the secondary and tertiary breaks.

18. The shell according to claim 16 wherein said internal fuses are configured so that while the shell is in the air the secondary break ignites before the tertiary break, thereby propelling the tertiary break.

*19. A fireworks shell comprising:*

*a primary break including a primary hull containing a primary break charge and a primary effect, the primary break having a primary break weight;*

*a secondary break positioned above and operably coupled with the primary break and including a secondary hull containing a secondary break charge and a secondary effect, the secondary break having a secondary break weight; and*

*a tertiary break positioned above and coupled to the secondary break and including a tertiary hull containing a tertiary break charge and a tertiary effect, the tertiary break having a tertiary break weight,*

*the primary, secondary, and tertiary break weights being selected to inhibit tumbling, and at least one of the secondary and tertiary break weights being less than the primary break weight.*

*20. The fireworks shell of claim 19, said tertiary break weight being less than the secondary break weight.*

* * * * *